United States Patent [19]

Pichler et al.

[11] Patent Number: 4,829,658
[45] Date of Patent: May 16, 1989

[54] METHOD FOR MANUFACTURING TERMINAL CONTACTS FOR THIN-FILM MAGNETIC HEADS

[75] Inventors: Alfred Pichler, Maisach; Joachim Hertrampf, Munich; Horst Pachonik, Taufkirchen, all of Fed. Rep. of Germany

[73] Assignee: Siemens Aktiengesellschaft, Berlin and Munich, Fed. Rep. of Germany

[21] Appl. No.: 221,532

[22] Filed: Jul. 19, 1988

[30] Foreign Application Priority Data

Sep. 24, 1987 [DE] Fed. Rep. of Germany ....... 3732207

[51] Int. Cl.⁴ ............................................. G11B 5/42
[52] U.S. Cl. ...................................... 29/603; 360/123
[58] Field of Search ................. 29/603; 360/122, 123; 427/116, 131

[56] References Cited

U.S. PATENT DOCUMENTS 4,613,404  9/1986  Tabei .
4,652,954  3/1987  Church ............................ 29/603 X
4,759,118  7/1988  Nakashima .......................... 29/603

FOREIGN PATENT DOCUMENTS 3132452  2/1983  Fed. Rep. of Germany .

Primary Examiner—Carl E. Hall
Attorney, Agent, or Firm—Hill, Van Santen, Steadman & Simpson

[57] ABSTRACT

Method for manufacturing terminal contacts for thin-film magnetic heads. A photolithographic process sequence is desirable when manufacturing coherent terminal contacts for thin-film magnetic heads that allows the technological complexity to be kept as low as possible taking metrological and mechanical points of view into consideration. To that end, an electrically conductive permalloy layer, buried under a protective aluminum oxide layer, is structured with a metallic mask such that interconnects that temporarily short the magnetic heads having two write/read heads on a substrate element during the photolithographic process execution are brought together at a location which is later parted along a parting line. As a result of the short, the application of an additional, metallic carrier layer as a galvanic underlayment for a gold film is avoided.

2 Claims, 2 Drawing Sheets

METHOD FOR MANUFACTURING TERMINAL CONTACTS FOR THIN-FILM MAGNETIC HEADS

The present invention is directed to a method for manufacturing terminal contacts for thin-film magnetic heads on a substrate that is subdivided along parting lines into individual substrate elements each having two write/read heads. The substrate surface is covered surface-wide with an electrically conductive permalloy layer that has a plurality of contact locations each having contact lugs directed toward the magnetic head and is structured by ion beam etching. The structured permalloy layer is covered surface-wide with a protective layer of aluminum oxide except for the contact locations that are provided with an electro-deposited gold film for the attachment of a bonding wire.

BACKGROUND OF THE INVENTION

The manufacture of terminal contact locations as used, for example, in integrated circuit technology is a technological process step having product-associated as well as manufacture-conditioned features. For example, it is standard in thin-film head technology to photolithographically generate terminal contacts of copper on a substrate having a plurality of integrated magnetic heads. It is particularly important to fashion the terminal contacts such that, first, the magnetic heads, which are buried under an aluminum oxide protective layer, can be tested after their large-area integration on the substrate and, second, the terminal contacts can be manufactured in a cost-effective way and can be easily bonded.

A method for manufacturing thin-film magnetic heads is possible wherein contact windows are formed in a protective layer of aluminum oxide that is about 50 μm thick with a chemically soluble location holder at the end of the photolithographic process. After the contact windows have been exposed in the protective layer, the exposed contact surface is gold-plated by a cover gold layer which is applied surface-wide to the substrate. Before bonding, the gold cover layer in the region of the exposed gold-plated contact surfaces is again removed and a bonding needle having a bonding wire is subsequently brought into the contact window. Critical disadvantages of the described method lie therein. First, the surface-wide application of the gold coat is uneconomical and, second, the adjustment of the bonding wire in extremely small contact windows is difficult. Adjusting the bonding wire is difficult because the walls of the contact windows are frequently contacted when adjusting and, thus, an increased risk of failure of the thin-film magnetic heads results.

SUMMARY OF THE INVENTION

It is therefore an object of the present invention to provide a method of the type initially cited wherein all contact locations of thin-film magnetic heads are fashioned on an electrically conductive permalloy layer covering a substrate surface-wide such that both a straight forward application of a bonding layer with a bonding needle is possible at the contact locations and the individual thin-film magnetic heads can be tested on the substrate before being divided into substrate elements by sawing.

In conjunction with a method of the type initially cited, this object is inventively achieved in a method in which: together with the masking of the electrically conductive permalloy layer of the substrate, interconnects are simultaneously defined that short the contact lugs; the masked permalloy layer is covered with a photoresist layer and contact windows that expose the permalloy layer are formed in this photoresist layer at contact locations by an exposure and development process; a copper layer is electrolytically applied over the exposed permalloy layer in the contact windows, the layer thickness of this copper layer being smaller than that of the photoresistive layer; the residues of the photoresistive layer are again removed from the electrically conductive permalloy layer and this being subsequently structured; the protective aluminum oxide layer is first applied surface-wide over the permalloly layer structured in this fashion, including the copper layer, and is subsequently mechanically eroded to such an extent that the remaining residues of the protective layer form a flush surface with a copper layer; this surface is cleaned and the gold film for securing the bonding wires is electro-deposited thereon in punctiform fashion at the contact locations; and the shorts between the contact lugs are eliminated by cutting the interconnects, said interconnects being eliminated before testing the magnetic heads and before separation of the substrate elements.

This solution is particularly distinguished in that the manufacture of terminal contacts for thin-film magnetic heads on individual substrate elements of a substrate wafer begins before a laser structuring process for the magnetic heads in terms of the chronological execution of the process; i.e., when an electrically conductive permalloy layer is still present surface-wide and a metallic mask is already completely structured. As a result of the structure of the metallic mask, contact lugs and interconnects are defined on the individual substrate element that has two write/read heads, these contact lugs and interconnects being directed toward the middle or, to a parting line of the substrate element. The interconnects and contact lugs thereby form a short-circuit on the permalloy layer. As a result of gold film needed for bonding can be electro-deposited at contact locations of the contact lugs on a copper layer that is embedded in a non-conductive, protective aluminum oxide layer that forms a flush lapping surface therewith, this being carried out without having to place a metallic carrier layer that covers the surface surface-wide under the gold film. For testing the magnetic heads, however, the short-circuit buried under the protective layer must be eliminated again. To that end, the substrate or the substrate wafer is cut at the parting lines and, thus, an expensive mechanical processing of the substrate is avoided. This is especially significant when the measurements at the magnetic heads would yield a high failure rate and it is therefore not rewarding to completely part the rejected substrate.

The solution of the invention thus has the advantage that the complexity of large-area integration of thin-film magnetic heads on a substrate is significantly reduced and the gold consumption is restricted to a necessary minimum.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENTS

Figure 1:
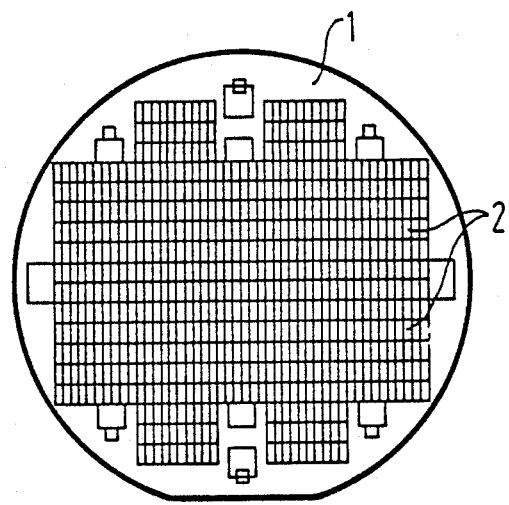
FIG. 1 is a plan view of a structure/substrate wafer subdivided into substrate elements.

As shown by way of example in FIG. 1, a method for manufacturing coherent terminal contacts buried under a protective layer for thin-film magnetic heads is executed on a substrate wafer 1. The coating or structuring of the wafer is accomplished in an execution of a photolithographic process as set forth with reference to an exemplary embodiment in FIGS. 3 through 6. FIG. 1 also shows the schematic division of the wafer surface into individual substrate elements 2.

Figure 2:
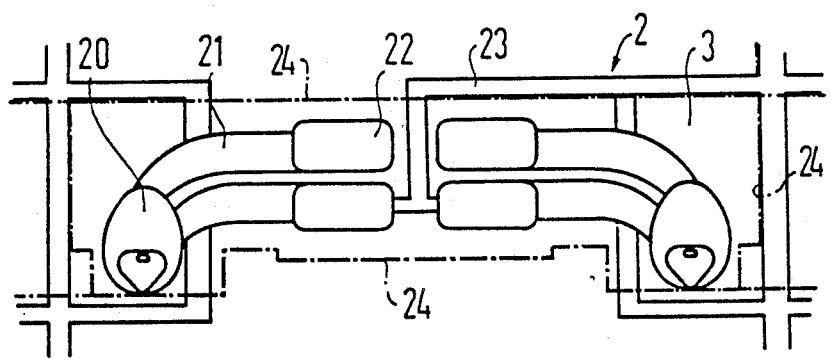
FIG. 2 is a plan view of the fundamental structure of an individual substrate element having two shorted terminal contacts for a thin-film magnetic head.

FIG. 2 shows the fundamental structure of a substrate element 2 in an enlarged illustration. The substrate element 2 contains two magnetic heads 20 arranged on an integrating area 3. A respective pair of contact lugs 21 is connected to the magnetic heads and are arranged symmetrically relative to the vertical axis of the substrate element. These contact lugs 21 proceed parallel in pairs and are directed in the direction toward the center of the substrate element 2. Every contact lug 21 has a contact reinforcement 22 at its free end.

FIG. 2, further, shows interconnects 23 that short the contact lugs or the magnetic heads 20 on the substrate element 2. One part of the interconnects 23 proceeds on an opposed side of parting lines 24 along which the substrate is divided into the individual substrate elements.

Figure 3:
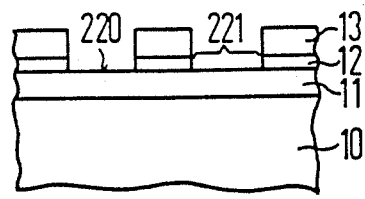
FIGS. 3 through 6 are cross-sectional views depicting the photolithographic manufacture of reinforced terminal contacts on a substrate provided with a permalloy layer.

An exemplary embodiment for photolithographic manufacture of reinforced, coherent terminal contacts for thin-film magnetic heads on a substrate 10 is set forth with reference to FIGS. 3 through 6. In FIG. 3 an electrically conductive permalloy layer 11 is electro-deposited surface-wide onto the substrate 10. The interconnects 23 are simultaneously defined with a metallic mask 12 needed for the structuring of the permalloy layer 11. A photo film 13 that is about 50 μm thick is subsequently applied over the permalloy layer 11 or over the metallic mask 12. This photo film 13 is in turn entirely removed at contact locations 220 for the contact reinforcements 22, being removed by an exposure and development process.

Figure 4:
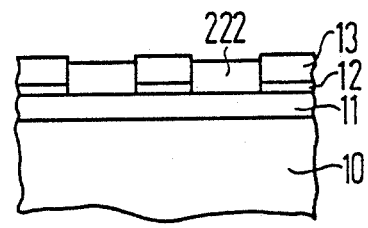

A contact window 221 exposing the permalloy layer 11 serves for the following process step shown in FIG. 4. A copper layer 222 is electro-deposited onto the exposed permalloy layer 11 in the contact window, the thickness of this copper layer 222 being smaller than that of the photo film 13. Then the remaining residues of the photo film 13 still present on the permalloy layer 11, or on the metallic mask 12 are removed and the exposed, masked permalloy layer is converted into a structured permalloy layer 110 by ion beam etching (see FIG. 5).

Figure 5:
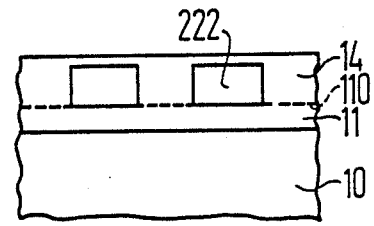
Figure 6:
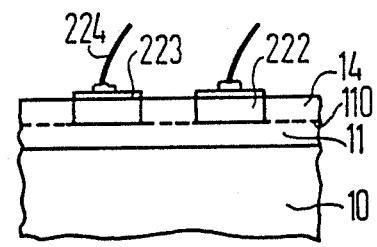

FIG. 5 shows the following integration phase, the application of a protective aluminum oxide layer 14 that covers both the structured permalloy layer as well as the copper layer surface-wide. The transition from FIG. 5 to FIG. 6 is characterized in that the applied protective layer is eroded by lapping to such an extent that a flush surface with the copper layer is produced. After the surface has been cleaned, as shown in FIG. 6, a gold film 223 is electro-deposited onto the contact locations 220 on the copper layer 222, this gold film 223 being required for the later bonding of a bond wire 224.

The photolithographic process sequence for the substrate is ended in this condition. Only now is the substrate cut along the parting lines 24 shown in FIG. 2 and, thus, the short circuit between the contact lugs 21 is eliminated, this having been necessary for the electro-deposition of the gold film. This cutting of the susbstrate now allows testing of the integrated magnetic heads on the substrate before the expensive, mechanical processing.

In terms of production engineering, the described method has the advantage that a galvanic build-up for the reinforced terminal contacts of thin-film magnetic heads is possible by the temporary shorting of interconnects and contact lugs without using an additional, metallic carrier layer as a galvanic underlaymant for the gold film. This results in reducing the technological requirements in the large-area, photolithographic manufacture of terminal contacts for magnetic heads.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not a limiting sense.

What is claimed is:

1. A method for manufacturing terminal contacts for thin-film magnetic heads on a substrate that is subdivided along parting lines into individual substrate elements each having two write/read heads, whereby a surface of the substrate is covered surface-wide with an electrically conductive permalloy layer that has at least a plurality of contact locations each having contact lugs directed toward the magnetic-head and is structured by ion beam etching into a structured permalloy layer, and whereby the structured permalloy layer is covered surface-wide with a protective layer of aluminum oxide except for the contact locations that are provided with an electro-deposited gold film for the attachment of a bonding wire, the method comprising the steps of:

masking the electrically conductive permalloy layer of the substrate and simultaneously defining interconnects that short the contact lugs;

covering the masked permalloy layer with a photoresist layer and forming contact windows that expose the permalloy layer in the photoresist layer at the contact locations by an exposure and development process;

electrolytically applying a copper layer over the exposed permalloy layer in the contact windows, the thickness of the copper layer being smaller than that of the photoresistive layer;

removing the residues of the photoresistive layer from the electrically conductive permalloy layer and subsequently structuring said permalloy layer;

applying the protective aluminum oxide layer surface-wide over the structured permalloy layer including the copper layer, and thereafter mechanically eroding to said aluminum oxide layer to such an extent that the remaining residues of the protective layer form a flush surface with the copper layer;

cleaning the resulting surface and electro-depositing the gold film for securing the bonding wires thereon in punctiform fashion at the contact locations;

and then eliminating the shorts between the contact lugs by cutting the interconnects, said interconnects being eliminated before testing the magnetic heads and before separation of the individual substrate elements.

2. The method according to claim 1, having a substrate wherein the interconnects per substrate element are brought together at least once at a location that is crossed by one of the parting lines, wherein the parting of the interconnects is produced by mechanical cutting of the substrate along the parting lines.

* * * * *